United States Patent
Kotary et al.

(10) Patent No.: US 12,367,102 B2
(45) Date of Patent: Jul. 22, 2025

(54) PLATFORM-INDEPENDENT ARCHITECTURE FOR SECURE SYSTEM RESET

(71) Applicant: Microsoft Technology Licensing, LLC, Redmond, WA (US)

(72) Inventors: Karunakara Kotary, Vancouver, WA (US); Akram Hamdy, Redmond, WA (US); Pingfan Song, Newcastle, WA (US); Neeraj Ladkani, Bothell, WA (US); Muhammad A. Ahmed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 18/299,791

(22) Filed: Apr. 13, 2023

(65) Prior Publication Data
US 2024/0345924 A1 Oct. 17, 2024

(51) Int. Cl.
*G06F 11/14* (2006.01)
*G06F 8/61* (2018.01)
(Continued)

(52) U.S. Cl.
CPC ............ *G06F 11/1417* (2013.01); *G06F 8/61* (2013.01); *G06F 11/1438* (2013.01);
(Continued)

(58) Field of Classification Search
CPC ............... G06F 8/60–66; G06F 21/572; G06F 11/1417; G06F 11/1438; G06F 11/3051; G06F 21/554; H04L 67/34; H04L 41/344
(Continued)

(56) References Cited

U.S. PATENT DOCUMENTS 7,849,454 B2 * 12/2010 Lambert ............ G06F 11/1417
717/168
2005/0229173 A1 10/2005 Mihm
(Continued)

FOREIGN PATENT DOCUMENTS

EP 3690653 A1 * 8/2020 .......... G06F 11/1004

OTHER PUBLICATIONS

Out-of-band management, Wikipedia, 2022, 4 pages, [retrieved on Mar. 13, 2025], Retrieved from the Internet: <URL:https://web.archive.org/web/20221105060426/https://en.wikipedia.org/wiki/Out-of-band_management#Implementation>.*
(Continued)

*Primary Examiner* — Geoffrey R St Leger
(74) *Attorney, Agent, or Firm* — Holzer Patel Drennan

(57) ABSTRACT

A platform-independent method of securely resetting a processing device includes detecting a predefined trigger event by a baseboard management controller (BMC) that executes system firmware on behalf of a managed host. In response to the predefined trigger event, the system is booted into a safe mode. While in the safe mode, a central processing system of the managed host is maintained in an off state, and a self-heal agent detects architectural characteristics of the managed host, establishes a connection to a cloud-based firmware catalog service, transmits the architectural characteristics of the managed host to the cloud-based firmware catalog service, and downloads a new version of system firmware from the cloud-based firmware catalog service that is compatible with the architectural characteristics of the managed host. The new version of the system firmware is automatically installed without powering on the central processing system of the managed host.

20 Claims, 4 Drawing Sheets

(51) Int. Cl.
  *G06F 21/55* (2013.01)
  *G06F 21/57* (2013.01)
  *H04L 41/344* (2022.01)
  *H04L 67/00* (2022.01)
(52) U.S. Cl.
  CPC .......... *G06F 21/554* (2013.01); *G06F 21/572* (2013.01); *H04L 67/34* (2013.01); *H04L 41/344* (2022.05)
(58) Field of Classification Search
  USPC .................................................. 717/168–178
  See application file for complete search history.

(56) References Cited

U.S. PATENT DOCUMENTS

| | | | |
|---|---|---|---|
| 2019/0236271 A1 | 8/2019 | Shivanna | |
| 2020/0089572 A1* | 3/2020 | Bodner | G06F 11/2284 |
| 2020/0133686 A1 | 4/2020 | Lakshminarasimha | |
| 2020/0278873 A1* | 9/2020 | Hsu | G06F 11/0751 |
| 2021/0103659 A1 | 4/2021 | Ladkani et al. | |

OTHER PUBLICATIONS

International Search Report and Written Opinion received for PCT Application No. PCT/US2024/024171, Jun. 6, 2024, 15 pages.

\* cited by examiner

PLATFORM-INDEPENDENT ARCHITECTURE FOR SECURE SYSTEM RESET

BACKGROUND

In some cloud architectures, server nodes in a processing fleet are each equipped with a baseboard management controller (BMC). A BMC is a small, specialized processor used for remote monitoring and management of a host system. The BMC can be accessed remotely via a dedicated or shared network connection and typically has multiple connections to the host system, giving it the ability to monitor various hardware of the host via sensors, power cycle the host, install firmware updates, perform event logging, and more.

A BMC provides a system administrator with a gateway to perform different monitoring, management, and maintenance tasks on a remotely-located machine without physically connecting to the machine. This capability can, for example, allow the administrator to receive real-time health data for thousands of host server nodes and remotely perform maintenance actions on the server nodes.

In the above types of systems, there exist of variety of scenarios where it is desirable to wipe all firmware on the BMC and/or the host system to return the entire machine to a known and trusted state. Current solutions generally entail multi-step human-performed diagnostics (e.g., to determine what firmware versions are trusted and compatible with the device) and manual install actions on a per-machine basis. Depending on the circumstances, custom tools may be employed. Many of these tools are error prone and present security risks.

SUMMARY

A platform-independent method of securely resetting a processing device includes detecting a predefined trigger event by a baseboard management controller (BMC) that executes system firmware on behalf of a managed host. In response to the predefined trigger event, the system is booted into a safe mode. While in the safe mode, a central processing system of the managed host is maintained in an off state, and a self-heal agent detects architectural characteristics of the managed host, establishes a connection to a cloud-based firmware catalog service, transmits the architectural characteristics of the managed host to the cloud-based firmware catalog service, and downloads a new version of system firmware from the cloud-based firmware catalog service that is executable by the BMC and that is compatible with the architectural characteristics of the managed host. The new version of the system firmware is automatically installed without powering on the central processing system of the managed host.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
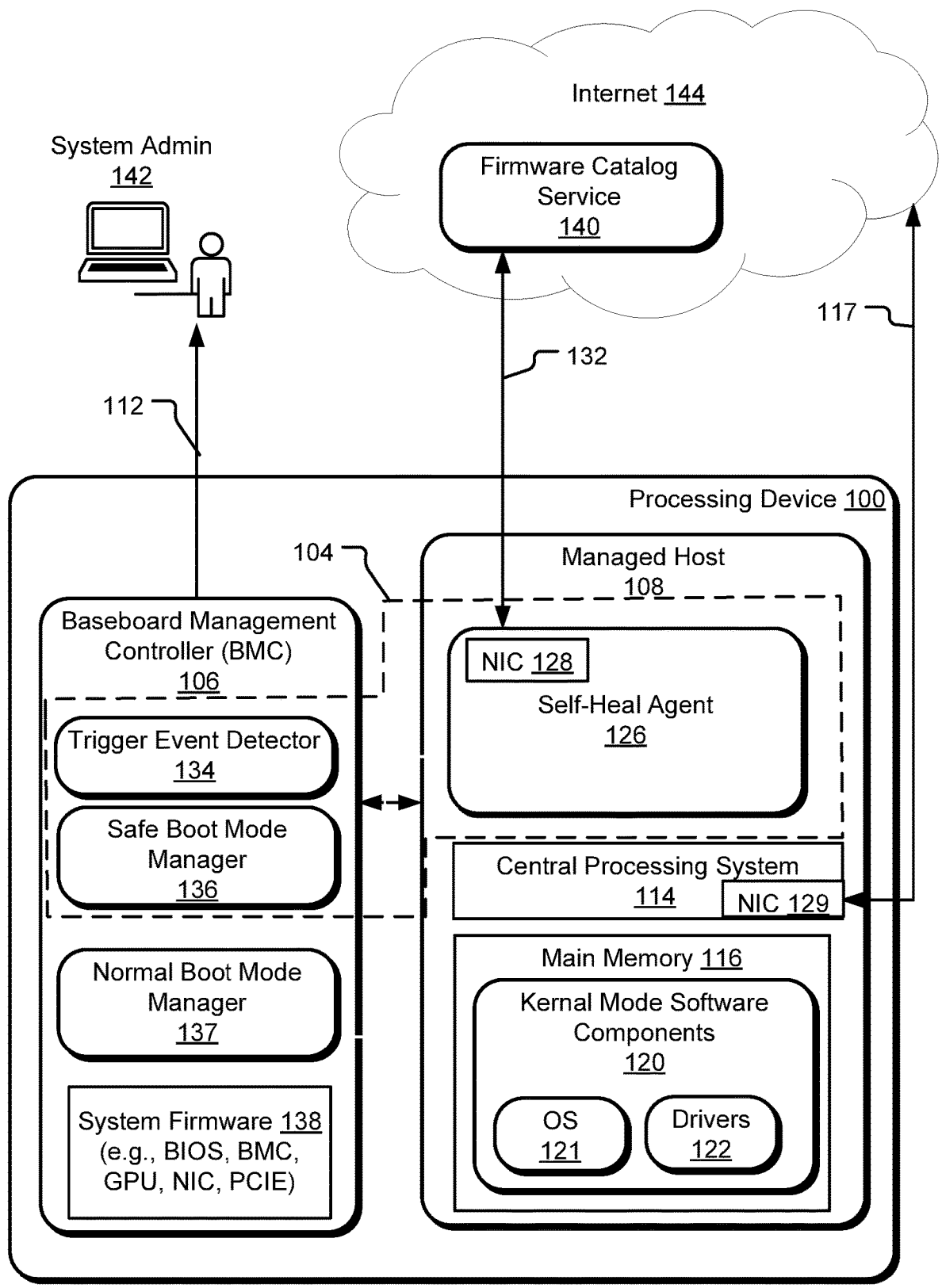
FIG. 1 illustrates a processing device that includes a secure reset system for automatically and autonomously returning the processing device to a known and trusted state in response to certain predefined trigger events.

The herein disclosed technology provides a platform-independent architecture for returning a processing device to a known, trusted state automatically and autonomously in response to a defined trigger event. This architecture is referred to herein as a "secure reset system." The disclosed secure reset system is specifically applicable to processing devices that include a baseboard management controller (BMC) that performs management actions (e.g., monitoring, security, power cycling) for a host device, referred to herein as the "managed host." The managed host can be understood as including hardware components of the traditional computer system, including a central processing unit and memory storing kernel mode software components including the operating system and various drivers for the hardware components.

According to one implementation, the disclosed secure reset system provides for resetting a processing device to a secure, known state in response to a defined trigger event. The trigger event is, for example, an event indicating that firmware on the device is potentially not trustable or is in an unknown state, such as a state that is incompatible with hardware or kernel mode software components of the managed host. In response to the trigger event, the processing device automatically re-boots in a safe mode and, during the safe mode, acquires and installs new system firmware (e.g., BMC firmware). Once the new system firmware is installed, additional reset operations are optionally performed, such as reinstalling the host operating system and/or performing system-wide state checks.

Throughout the entire safe boot sequence, key components of the managed host including the central processing system (e.g., CPU) remain in an off state. While the central processing system is powered off during the safe mode operations, power is provided to a self-heal agent (e.g., microprocessor with control circuitry) that detects architectural characteristics of the managed host, establishes a connection to a cloud-based firmware catalog service, and downloads new system firmware that is compatible with the detected architectural characteristics of the managed host. Once downloaded and installed, this new firmware returns the BMC to a known and trusted state. The BMC can, at that point in time, perform a complete state check to ensure self-compatibility with kernel mode software components executing on the managed host and initiate updates of those components as-needed to guarantee system-wide trust and compatibility.

Notably, the disclosed secure reset system is platform-independent, meaning that it can be integrated into any processing device with a BMC and managed host regardless of the hardware characteristics of the system and/or of the operating system executed by the managed host. This platform independence is attributable, in part, to the architecture of the self-heal agent, which is able to independently communicate with a cloud-based service when the host CPU is off. Consequently, the self-heal agent is able to acquire firmware for returning the BMC to a known and trusted state compatible with the managed host even if the managed host is, at the time of the secure reset, in a state that does not support communications with the BMC, such as due to hardware and/or operating system incompatibility with the BMC of the managed host.

FIG. 1 illustrates a processing device 100 that includes a secure reset system 104 for automatically and autonomously returning the processing device 100 to a known and trusted state in response to certain predefined trigger events. The processing device 100 includes a baseboard management controller (BMC 106) that is coupled to a managed host 108 that includes components of the traditional computer. In one implementation, the managed host 108 includes a motherboard supporting some or all of the components shown within the managed host 108, while components of the BMC 106 reside on a separate integrated circuit chip (ICC). In other implementations, the BMC 106 is formed integrally on the motherboard of the managed host 108.

The BMC 106 can be understood as being a specialized controller that manages an interface between system management software and platform hardware. This specialized controller includes combination of software and hardware elements including a microprocessor (not shown) that executes system firmware 138 that may, for example, include a BIOS (basic input/output system) that starts the processing device 100 after it is powered on and that manages data flow between the operating system 121 and the attached devices such as hard disk(s), keyboard, mouse, printer, video adapter, etc. The system firmware 138 stored on the BMC 106 further includes BMC firmware that is executable to effect actions such as monitoring various sensors (not shown) of managed host 108 and/or sending alerts to a system administrator via a first out-of-band network connection 112 (e.g., ethernet, USB, or any other suitable protocol interface) if any measurements indicate a potential issue with the managed host 108. Additionally, the system firmware 138 may include discrete card firmware such as firmware for a graphics processing unit (GPU), various network interface controllers (NICs), storage, peripheral component interface express (PCIE) cards, etc.

As used herein, the term "out-of-band network connection" implies that the connection is outside of the knowledge of a host operating system (e.g., operating system 121). In one implementation, the first out-of-band network connection 112 is a channel dedicated for device maintenance that allows a system administrator 142 to monitor aspects of the processing device 100 regardless of whether the processing device is powered on or whether an OS is installed and functional on the managed host 108. The system administrator may also remotely communicate with BMC 106 via the first out-of-band network connection 112 to take corrective actions, such as to reset or cycle the processing device 100.

The managed host 108 may be understood as including a motherboard supporting hardware and software components of a traditional computer system including a central processing system 114, which includes one or more CPUs, GPUs, etc., and main memory 116, which typically includes both volatile and non-volatile memory components. The main memory 116 stores kernel mode software components 118, such as the operating system 121 and various drivers 122 that generate controls signals to operate the hardware components. The central processing system 114 communicates with various cloud services on the internet 144 through a first network interface controller (NIC) 129 via an in-band network connection 117 that cannot be utilized without certain software installed executing on the managed host 108. In one implementation, the in-band network connection 117 is inoperable unless the operating system 121 has been booted and the first NIC 129 powered on.

The secure reset system 104 is responsible for autonomously and automatically executing a secure reset sequence that returns the entire processing device to a known and trusted state. The secure reset system 104 includes a self-heal agent 126 with platform-independent control electronics configured to identify hardware components of the managed host 108, establish a secure web connection, and download firmware for the BMC 106 (e.g., to replace system firmware 138) that is compatible with the hardware components of the managed host 108. The self-heal agent 126 includes at least a microprocessor (not shown), memory (e.g., DRAM) that is separate from the main memory 116 of the managed host 108, and a second network interface controller (NIC 128) that provides a second out-of-band network connection 132 to the internet 144 that is separate from the in-band network connection 117 used by the central processing system 114. The self-heal agent is shown to reside within the managed host 108 but may, in other implementations, reside in the BMC 106 or on a separate chip that includes the BMC 106.

In addition to the self-heal agent 126, the secure reset system 104 additionally includes a trigger event detector 134 and safe boot mode manager 136 that are shown as sub-components of the BMC 106, consisting of software or a combination of software and hardware. In other implementations, some or all functionality of the trigger event detector 134 is implemented by hardware of the managed host 108 rather than the BMC 106.

The trigger event detector 134 executes operations that effectively listen to system signals indicative of an occurrence of one or more types of predefined trigger events. For example, the predefined trigger events are events indicating that firmware on the device is potentially not trustable or is in an unknown state, such as a state that is incompatible with hardware or kernel mode software components 120 of the managed host 108. A few examples of predefined trigger events are included below; however, it should be understood that the trigger event detector 134 can be programmed to listen for any type of predefined event that is determined, by a developer, to provide cause for initiating a secure system reset.

In one implementation, the trigger event detector 134 listens for a control signal indicative of a chassis intrusion. For example, the processing device 100 may be physically transported (e.g., between data centers) in a chassis and include hardware that detects if and when the processing device 100 is physically accessed (e.g., chassis door is opened) or physically removed from the chassis. Physical access to or removal of the processing device 100 from the chassis could indicate that firmware on the processing device 100 has been tampered with, providing incentive for a complete system reset.

In other implementations, the trigger event detector 134 listens for signals consistent with defined trigger events that indicate a likelihood of incompatibility between firmware of the BMC 106 and the hardware and/or kernel mode software components 120 of the managed host 108. This risk of incompatibility is especially high in systems that integrate the BMC 106 on a specially-purposed chip (referred to herein as a "BMC chip") that couples to the motherboard of a host system (e.g., where the motherboard supports the some or all of the managed host 108). For example, the BMC chip may be manufactured separately from the managed host 108 and designed to couple with different types of motherboards potentially manufactured by different suppliers and/or designed to execute different operating systems. In these devices, different firmware may need to be installed on the BMC 106 depending upon the hardware and kernel mode software components 120 of the managed host 108.

In the above device design with a BMC chip that is separate from the motherboard of the managed host 108, the BMC chip is, in some implementations, a field-replaceable unit (FRU) serviceable independent of the managed host 108 and/or designed to be host-swapped with different hosts. Since different hosts potentially include different hardware architectures and/or execute different operating systems, the BMC 106 may be incapable of communicating with the central processing system 114 of the managed host 108 in some instances when the system firmware 138 of the BMC 106 is incompatible with software or hardware components of the managed host 108.

In one implementation consistent with the above, the trigger event detector 134 detects a trigger event whenever the BMC 106 is initially coupled to a new motherboard. The use of the detected coupling as the trigger event is beneficial in scenarios where the BMC chip is decoupled from the managed host 108 for servicing (e.g., potentially altering its firmware) and then re-coupled to a different or the same managed host 108. Likewise, this same trigger event can be useful in scenarios where the BMC chip is leased to a hardware tenant (e.g., a cloud server farm) and then returned to the lessor for refurbishing and/or reuse. Rather than require the lessor to manually reconfigure the chip with trusted firmware compatible with a new host that is to be paired with the BMC chip, the physical coupling of the BMC chip to the next host serves automatically and autonomously initiate this reconfiguration.

In response to detecting a predefined trigger event such as any of the example trigger events described above, the trigger event detector 134 triggers a reboot of the device into a safe boot mode. For example, the trigger event detector 134 sets a flag (e.g., flag generally indicating that the system firmware 138 is not trustworthy) and initiates a power cycle. When the BMC 106 is powered on following the power cycle, a safe boot mode manager 136 reads the flag and boots the device in a safe boot mode. While in the safe boot mode, and processing device 100 automatically and autonomously executes a sequence of below-described operations effective to update (e.g., overwrite and replace) the system firmware 138.

When the BMC 106 boots in the safe boot mode, power is provided to a limited subset of components on the processing device 100 that play an active role in carrying out one or more operations for the secure reset sequence. During the safe boot mode and the entirety of the secure reset sequence, the central processing system 114 is powered off. Consequently, the operating system 121 is not loaded and the in-band network connection 117 remains non-functional. Keeping the central processing system 114 of the managed host 108 in the off state throughout the secure reset sequence prevents the system firmware 138 from communicating with hardware and/or software components of the managed host 108 that it is potentially incompatible with. If, for example, the BIOS of the BMC 106 were incompatible with the operating system 121 and tried to load the operating system 121, the entire processing device 100 may be rendered inoperable.

When booting in the safe mode, the BMC 106 boots up the self-heal agent 126, which proceeds to collect architectural characteristics of the managed host 108 by taking an inventory of detectable hardware components and protocols utilized by each of the hardware components. This architectural characteristics of the managed host 108 include, for example, the GUID and/or SKU of the managed host, the type of processor(s) included in the central processing system 114, the type(s) of devices included in the main memory 116, the various drivers 122 loaded, and/or the protocols used by each of the components. In one implementation, some or all of these architectural characteristics are stored in a field-replaceable unit of memory that is on a motherboard of the managed host 108 (e.g., read-only memory (ROM), electrically erasable read-only memory (EEPROM), static random access memory (SRAM), or the like).

Following the above actions, the self-heal agent 126 uses the second out-of-band network connection 132 to establish a secure connection to a cloud-based firmware catalog service 140, which manages a repository of different system versions of the system firmware 138. The self-heal agent 126 provides the firmware catalog service 140 with a request for system firmware that is compatible with the acquired architectural characteristics of the managed host 108, and the firmware catalog service 140 identifies a select version of the system firmware 138 (e.g., both BMC and BIOS) that is compatible with the architectural characteristics of the managed host 108 (e.g., detected hardware components of the managed host 108 and the protocols used by the managed host 108). The self-heal agent 126 then downloads this select version of the system firmware 138 from the firmware catalog service 140 and uses this to overwrite the previous version of the system firmware 138.

In one implementation, the safe boot mode manager 136 creates a record that is read upon the next boot (in a normal boot mode) indicating that the prior boot was in safe mode. Following this, the BMC 106 is power cycled and rebooted in a normal boot mode managed by a normal boot mode manager 137. During the normal boot mode, the normal boot mode manager 137 reads the record created by the safe mode manager 136 and determines, based on the record, that the previous boot was in safe mode. In response, the normal boot mode manager 137 boots an agent that installs a new (e.g., trusted) copy of the OS 121 on the managed host 108 and/or that initiates a complete system state check of the kernel mode software components 120 to ensure compliance with a defined standard (e.g., a standard set by a platform root of trust or by stored last known good (LKG) versioning information associated the OS 121). For example, a hash is computed for each of the kernel mode software components 120 and the hash for each component is compared to a listing of hashes stored within the LKG versioning information. If no match is found, the remediation agent downloads a newest version of the component available from a web-based data source, essentially ensuring that all host-side firmware components are trusted and compatible with the new OS 121.

Notably, the above process provides for automatically and autonomously updating the system firmware 138 to secure version that compatible with the hardware and protocols of the processing device 100 in a platform-independent manner-meaning, this process does not depend upon hardware of the host system (e.g., motherboard type, CPU type, memory type), interface protocols used, or the operating system 121 that is installed on the managed host 108 at the time of the secure system reset. In implementations where the safe boot sequence creates a record of the safe mode boot (as described above), the process can further provide for a complete update of the OS (ensuring the installed version is trustworthy) and/or checking and reinstalling remaining host-side firmware as necessary to ensure system-wide trust and compatibility.

Figure 2:
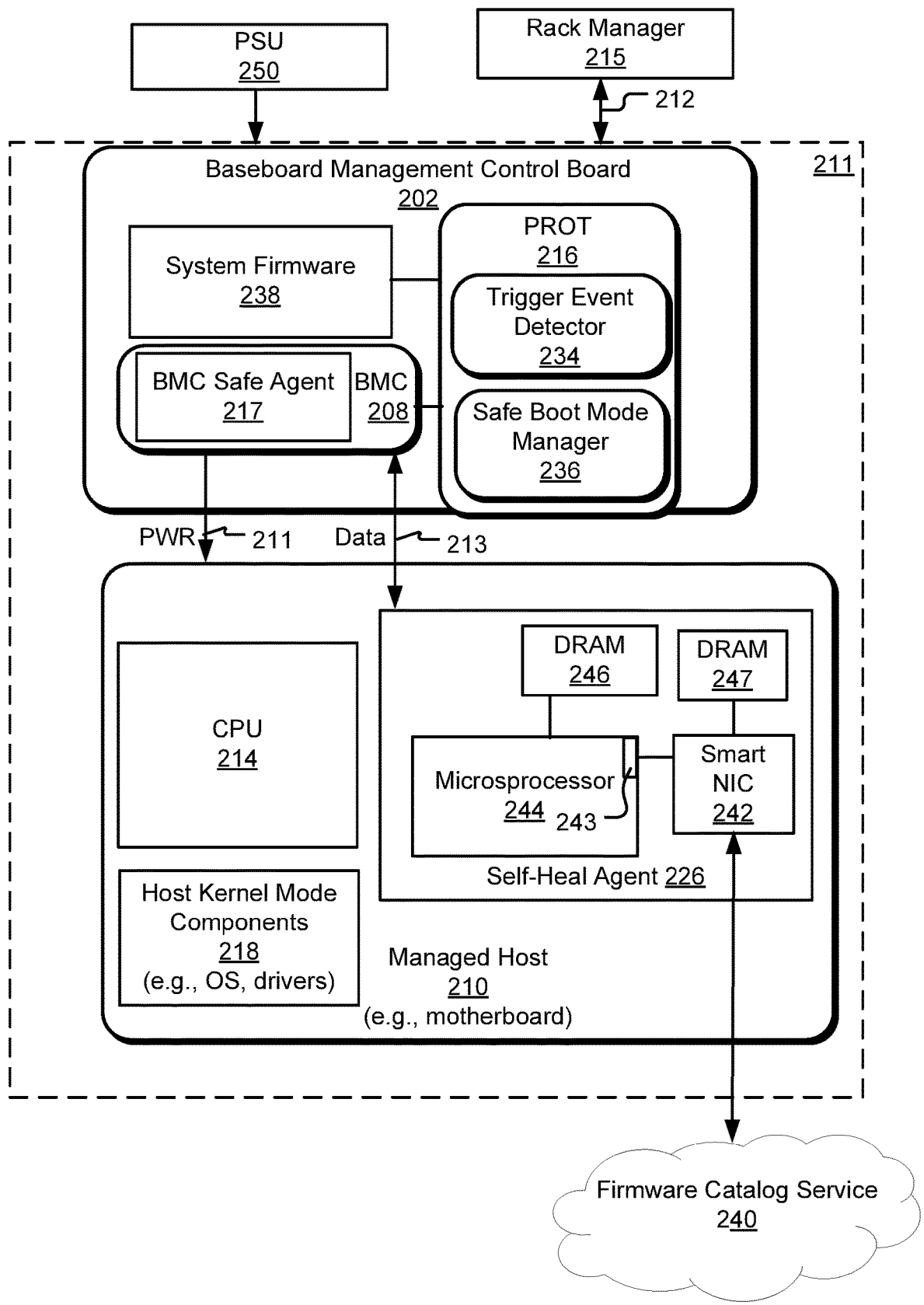
FIG. 2 illustrates another example architecture that includes a secure reset system for automatically and autonomously returning a processing device to a known and trusted state.

FIG. 2 illustrates another example architecture that includes a secure reset system for automatically and autonomously returning a processing device 200 to a known and trusted state in response to certain predefined trigger events. The processing device 200 includes a baseboard management control board 202 with a baseboard management controller (BMC 208) that performs monitoring, management, and/or security actions with respect to a managed host 210 (e.g., a host server). An administrator can remotely communicate with the BMC 208 through an out-of-band connection 212 with a rack manager 215 which is, in one implementation, also coupled to multiple other processing devices (e.g., servers) residing in a chassis with the processing device 200.

In addition to the BMC 208, the baseboard management control board 202 supports a platform root of trust (PROT) 216 that is responsible for generating and protecting keys usable to verify security and an attestation feature that establishes trustworthiness of critical software components installed within the processing device 200.

The PROT 216 includes a trigger event detector 234, which may be understood as a watch agent that monitors the processing device 200 to detect certain trigger events, such as to detect a signal indicative of an unauthorized chassis intrusion, a signal indicating that the baseboard management control board 202 has just been coupled to a new piece of hardware (e.g., when the baseboard management control board 202 is first coupled to a motherboard), a power cycle initiated by a particular process, or receipt of a command from the rack manager 215 requesting a secure system reset.

When the trigger event detector 234 detects one of the predefined trigger event(s), the trigger event detector 234 instructs a safe boot mode manager 236 to reboot the processing device 200 in a safe boot mode, and the safe boot manager begins 236 a safe mode boot sequence. During the safe mode boot sequence, the safe boot mode manager disables interface access to flash memory storing system firmware 238 (e.g., BIOS and BMC firmware images), prohibiting the BMC 208 from reading the system firmware 238.

The safe boot mode manager 236 then boots up the BMC 208 and executes a BMC safe agent 217. In one implementation, the BMC safe agent 217 includes immutable firmware that runs in lieu of a BMC image within system firmware 238. This firmware executes and power is the provided, via power interface 211, to a limited subset of components on the managed host 210, including a self-heal agent 226 that begins executing firmware recovery logic. Throughout execution of the firmware recovery logic and the duration of the entire safe mode, power is not provided to a central processing unit (CPU) 214 of the managed host 210. Consequently, host kernel mode components 218 (e.g., the host OS, drivers) are not loaded in memory and do not execute.

The self-heal agent 226 may include various control circuitry in different implementations such as a system-on-chip (SOC), application-specific integrated circuit (ASIC), field-programmable gate array (FPGA), or smart NIC CPU, and may be understood as including at least some memory (e.g., DRAM 246), a microprocessor 244 and a network interface circuitry (e.g., a NIC 243 coupled to a smart NIC 242, which may include its own memory (e.g., DRAM 237)).

After powering on, the self-heal agent 226 establishes a connection with the BMC 208 via a high speed data interface 213, which is, for example, a high-speed USB interface (vNIC). Once this high speed data connection is established, the self-heal agent 226 takes determines architectural characteristics of the managed host 210. For example, the self-heal agent 226 takes an inventory of the hardware included in the managed host 210 and/or the protocols used by each detected hardware component. This inventoried information may, for example, include a globally unique identifier (GUID) and stock keeping unit (SKU) of the motherboard within the managed host 210 or identifiers of other hardware components within the managed host 210.

The self-heal agent 226 then establishes a connection to a firmware catalog service 240 through a network interface controller (e.g., smart NIC 442) that is separate from a NIC that is used by the CPU 214 of the managed host 210. The self-heal agent 226 provides the firmware catalog service 240 with inventoried local state information and, with this information, requests a compatible firmware bundle for download. In one implementation, the requested firmware download includes a new BMC image and BIOS image to replace images within the system firmware 238, as well as an updated PROT image to replace the current PROT firmware executed by the PROT 216 when performing security actions, such as attesting to the authenticity and trustworthiness of newly-acquired firmware.

In addition to downloading the above-described firmware, the self-heal agent 226 also retrieves an update script from the firmware catalog service 240. The self-heal agent then executes the update script to install the PROT firmware along with the new BIOS image and the new BMC image and their respective associated security manifests. Following this install, the self-heal agent 226 instructs the safe boot mode manager 236 to release the system back to a normal boot mode. In response, the safe boot mode manager 236 records an instance of the safe boot mode in a cache of the PROT 216, and the self-heal agent 226 instructs the BMC 208 to trigger a power cycle of the processing device 200 by a power supply unit (PSU) 250.

When booting up following the safe bode, the PROT boots in a normal mode, which provides for verifying the new version of the system firmware 238 (e.g., BMC and BIOS images in the baseboard management control board 202) before they are loaded into memory for the first time. The newly-installed BMC image is then loaded, and this initiates a boot of the host CPU 214 and host BIOS. When the host BIOS runs, it reads the recorded (cached) instance of the safe mode boot and determines that the system has just from safe mode. Based on this (and the underlying the assumption that the host OS is not trustworthy), the host BIOS loads a preboot execution environment (PXE) (not shown) that proceeds to download and install a new copy of the host OS.

Following the install of the new OS, the PXE loads a remediation client on the BMC 208 that initiates a complete system state check to ensure that each other component of the host kernel mode components 217 (e.g., drivers) is of a version that matches a last known good (LKG) version of the component identified in a listing that is stored in association with the OS 121. In the event that the remediation client determines that one or more of the component(s) do not match the corresponding LKG version, the remediation client replaces these component(s) with newly-downloaded versions that that do match the corresponding LKG version. In one implementation, the remediation client resides in the cloud and is downloaded upon boot of the PXE. The remediation client is capable of fully updating the host OS as well as any other system firmware.

Following the complete system state check, the remediation client instructs the PROT to remove the recorded instance of the safe mode from the cache that is read during the normal boot sequence (e.g., to trigger the PXE), thereby ensuring that the next boot sequence is a nominal boot sequence that does not re-install the operating system again.

Figure 3:
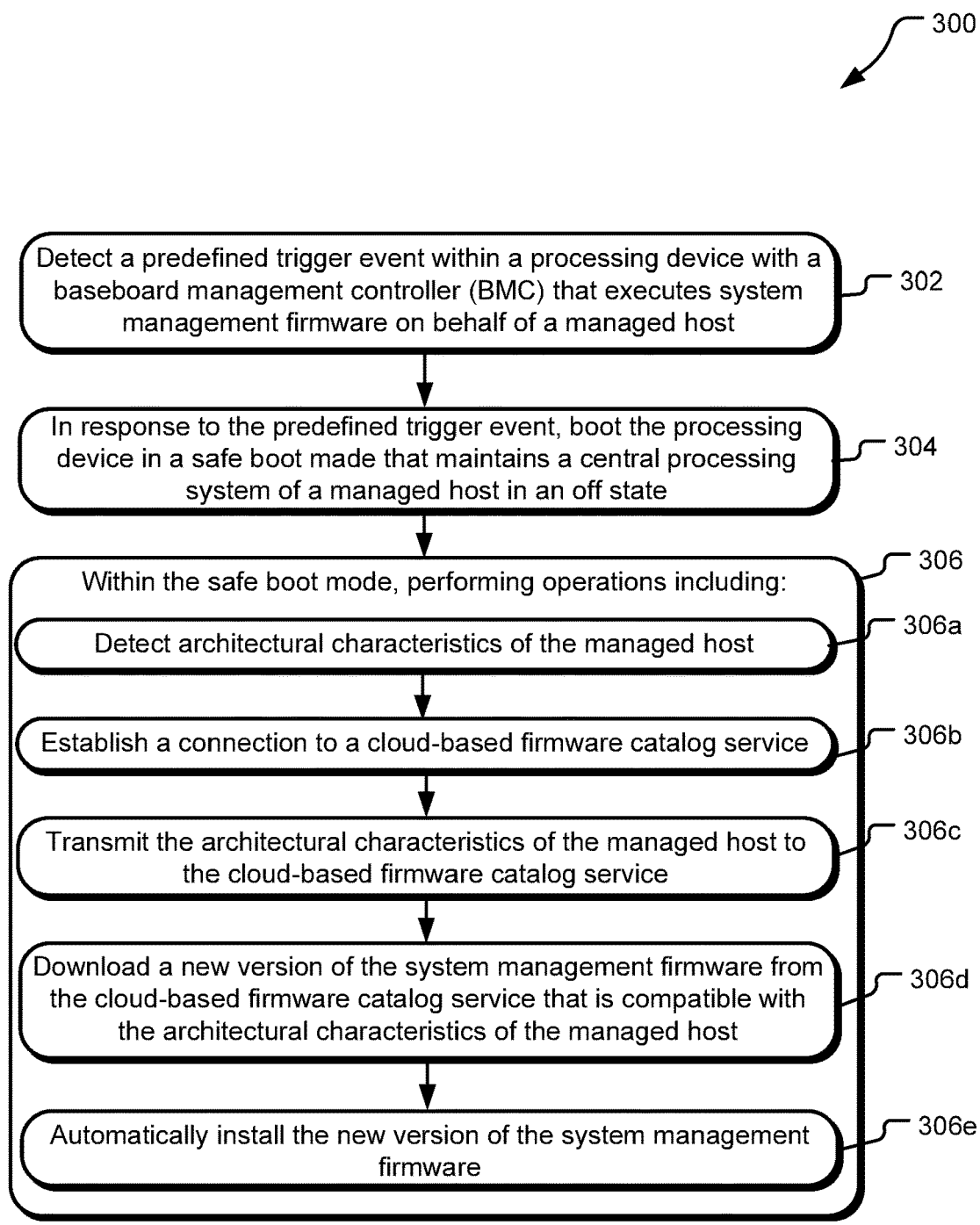
FIG. 3 illustrates example operations for securely resetting a processing device to a known and trusted state.

FIG. 3 illustrates example operations 300 for securely resetting a processing device to a known and trusted state. According to one implementation, the processing device includes a baseboard management controller (BMC) that executes system firmware to perform management actions (e.g., monitoring, maintenance, security, power cycling) on behalf of a managed host device. A detecting operation 302 detects a predefined trigger event within the processing device that is, for example, identified by a developer or administrator as an event suggesting that system firmware may be compromised/untrustworthy or that current system firmware is potentially incompatible with hardware or kernel mode software components on the managed host (e.g., in scenarios where the BMC is integrated on a component that serves as a field-replaceable unit (FRU) and/or that is capable of coupling to different hosts with different hardware components, operating systems, protocols, etc.

In response to detection of the predefined trigger event, a safe boot operation 304 boots the processing device in a safe boot mode that maintains a central processing system of the managed host in an off state while providing power to a limited subset of components within the managed host. These powered components perform safe mode operations 306 that effect a complete overwrite of the system firmware with a known and trusted firmware version.

Specifically, the safe mode operations 306 include a first detecting operation 306a that detects architectural characteristics of the managed host, such as by taking an inventory of detectable hardware components within the host and the protocols used by those components. The safe mode operations 306 include a data link establishment operation 306b that establishes a data link with a cloud-based firmware catalog service. In one implementation, this data link is established using a NIC that is different from the NIC used by a CPU of the managed host. The data link is established without powering on the CPU of the managed host and without loading the host OS.

In addition to the above, the safe mode operations 306 still further include a transmit operation 306c that transmits the architectural characteristics of the managed host to the cloud based firmware catalog service, and a download operation 306d that downloads new version of the system firmware from the cloud-based firmware catalog service that is executable by the BMC and compatible with the architectural characteristics of the managed host. Finally, an install operation 306e installs the new version of the system firmware without powering on the central processing system of the managed host 314. Following this install, a reboot may be initiated to load the new system firmware for the first time. In one implementation, a logging operation (not shown) logs an instance of the safe boot that is read by the CPU of the managed host on the next boot in normal boot mode. In response, the managed host downloads and self-installs a new copy of its operating system and performs a system-wide check to ensure that all kernel mode components of the managed host are up-to-date.

Figure 4:
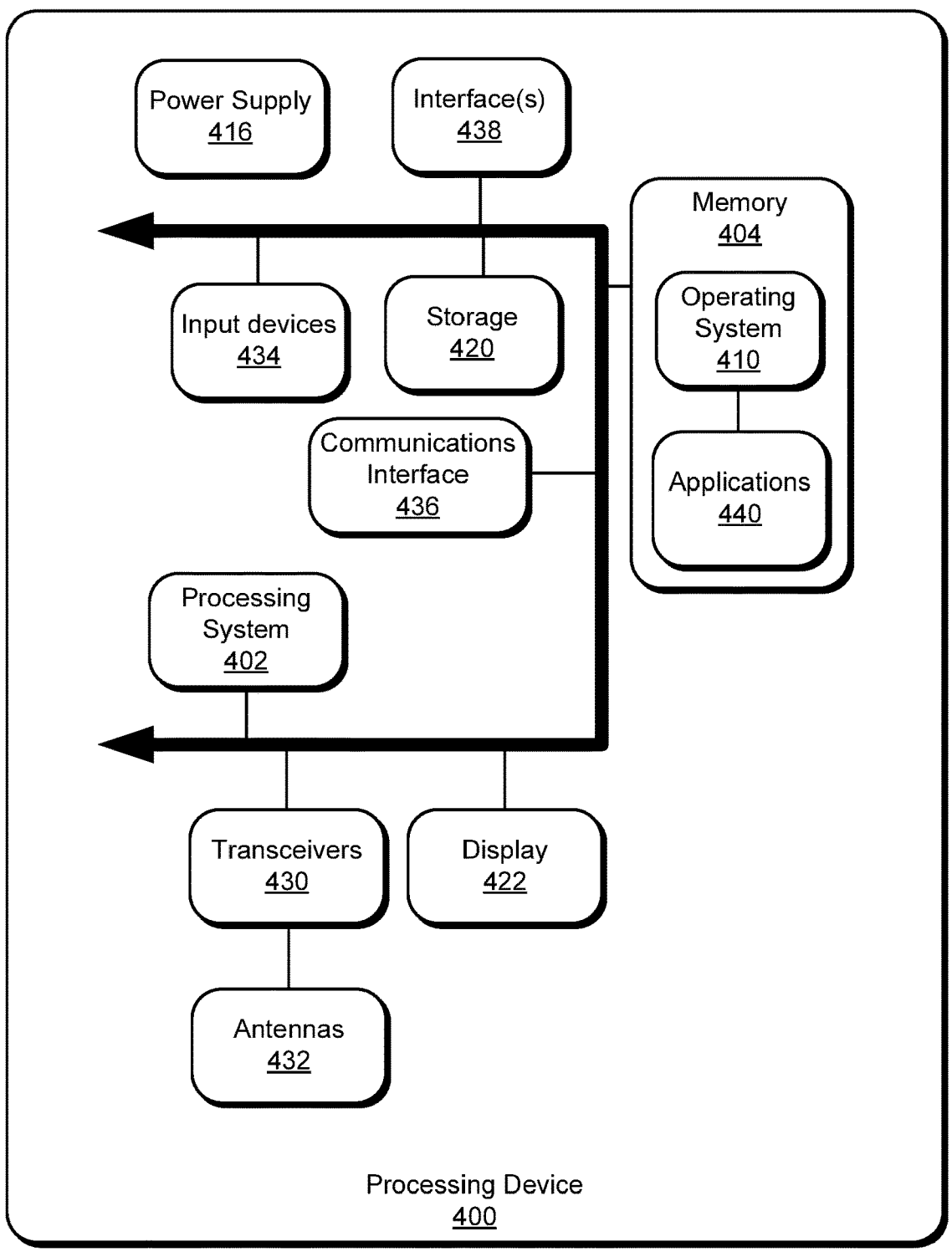
FIG. 4 illustrates an example schematic of a processing device suitable for implementing aspects of the disclosed technology.

FIG. 4 illustrates an example schematic of a processing device 400 suitable for implementing aspects of the disclosed technology. The processing device 400 includes one or more processor unit(s) 402, memory device(s) 404, a display 406, and other interfaces 408 (e.g., buttons). The processor unit(s) 402 may each include one or more CPUs, GPUs, etc.

The memory device(s) 404 generally includes both volatile memory (e.g., RAM) and non-volatile memory (e.g., flash memory). An operating system 410, such as the Microsoft Windows® operating system, the Microsoft Windows® Phone operating system or a specific operating system designed for a gaming device, may resides in the memory device(s) 404 and be executed by the processor unit(s) 402, although it should be understood that other operating systems may be employed.

One or more applications 412 (e.g., the trigger event detector 134, safe boot mode manager 136 or self-heal agent 126 of FIG. 1) are loaded in the memory device(s) 404 and executed on the operating system 410 by the processor unit(s) 402. The applications 412 may receive inputs from one another as well as from various input local devices such as a microphone 434, input accessory 435 (e.g., keypad, mouse, stylus, touchpad, gamepad, racing wheel, joystick), and a camera 432. Additionally, the applications 412 may receive input from one or more remote devices, such as remotely-located servers or smart devices, by communicating with such devices over a wired or wireless network using more communication transceivers 430 and an antenna 438 to provide network connectivity (e.g., a mobile phone network, Wi-Fi®, Bluetooth®). The processing device 400 may also include one or more storage devices 428 (e.g., non-volatile storage). Other configurations may also be employed.

The processing device 400 further includes a power supply 416, which is powered by one or more batteries or other power sources and which provides power to other components of the processing device 400. The power supply 416 may also be connected to an external power source (not shown) that overrides or recharges the built-in batteries or other power sources.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method of securely resetting a processing device includes detecting a predefined trigger event in a processing device that includes a baseboard management controller (BMC) that executes system firmware on behalf of a managed host coupled to the BMC. In response to detection of the predefined trigger event, booting the processing device in a safe boot mode that maintains a central processing system of the managed host in an off state while performing a sequence of safe mode operations. The sequence of safe mode operations includes: detecting architectural characteristics of the managed host; establishing a connection to a cloud-based firmware catalog service; transmitting the architectural characteristics of the managed host to the cloud-based firmware catalog service; downloading a new version of system firmware from the cloud-based firmware catalog service that is executable by the BMC and that is compatible with the architectural characteristics of the managed host; and automatically installing the new version of the system firmware without powering on the central processing system of the managed host.

In another example method of any preceding method, the safe mode operations further include recording an instance of the safe boot mode and initiating a reboot of the processing device following install of the system firmware. The method further comprises downloading and installing a new operating system for the managed host in response to reading the instance of the safe boot mode during the reboot.

In still another example method of any preceding method, the method further comprises verifying that each of multiple firmware components installed on the managed host matches a last known good (LKG) version associated with the new operating system. The verification nis performed in response to installing the new operating system.

In yet still another example method of any preceding method, the connection to the cloud-based firmware catalog service is through a first network interface controller (NIC) that is different from a second NIC utilized by the central processing system of the managed host.

In still another example method of any preceding method, detecting the architectural characteristics of the managed host is performed by a self-heal agent that includes a microprocessor residing on a motherboard of the managed host. In this implementation, the BMC resides on a specially-purposed chip that couples with the motherboard, the specially-purposed chip being serviceable as a field-replaceable unit (FRU) independent of the motherboard.

In yet still another example method of any preceding method, the predefined trigger event is a detected new coupling between the BMC and the managed host.

In still another example method of any preceding method, the predefined trigger event is a detected intrusion to a chassis storing the processing device.

In still another aspect, some implementations include a computer system for securely setting a processing device to a known and trusted state. The computing system includes hardware logic circuitry that is configured to perform any of the methods described herein.

In yet another aspect, some implementations include a computer-readable storage medium for storing computer-readable instructions. The computer-readable instructions, when executed by one or more hardware processors, perform any of the methods described herein.

In still another aspect, a system disclosed herein includes a baseboard management controller (BMC) that executes system firmware on behalf of a managed host. The system includes a means for booting the processing device in a safe boot mode in response to detecting a predefined trigger event and a means for executing a sequence of safe mode operations while the processing devices is in the safe boot mode with a central processing system of the managed host being maintained in an off state. The sequence of safe mode operations includes detecting architectural characteristics of the managed host; establishing a connection to a cloud-based firmware catalog service; transmitting the architectural characteristics of the managed host to the cloud-based firmware catalog service; downloading a new version of system firmware from the cloud-based firmware catalog service that is executable by the BMC and that is compatible with the architectural characteristics of the managed host; and automatically installing the new version of the system firmware without powering on the central processing system of the managed host.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method of secure reset for a processing device, the method comprising:
detecting a predefined trigger event in a processing device that includes a baseboard management controller (BMC) that executes system firmware on behalf of a managed host coupled to the BMC;
in response to detection of the predefined trigger event, booting the processing device in a safe boot mode that maintains a central processing system of the managed host in an off state while performing a sequence of operations including:
detecting architectural characteristics of the managed host;
establishing a connection to a cloud-based firmware catalog service;
transmitting the architectural characteristics of the managed host to the cloud-based firmware catalog service;
downloading a new version of system firmware from the cloud-based firmware catalog service that is executable by the BMC and that is compatible with the architectural characteristics of the managed host; and
automatically installing the new version of the system firmware without powering on the central processing system of the managed host.

2. The method of claim 1, wherein the sequence of operations further includes:
recording an instance of the safe boot mode; and
initiating a reboot of the processing device following install of the new version of the system firmware, and wherein the method further comprises downloading and installing a new operating system for the managed host in response to reading the instance of the safe boot mode during the reboot.

3. The method of claim 2, further comprising:
verifying, in response to installation of the new operating system, that each of multiple firmware components installed on the managed host matches a last known good (LKG) version associated with the new operating system.

4. The method of claim 1, wherein the connection to the cloud-based firmware catalog service is through a first network interface controller (NIC) that is different from a second NIC utilized by the central processing system of the managed host.

5. The method of claim 1, wherein detecting the architectural characteristics of the managed host is performed by a self-heal agent that includes a microprocessor residing on a motherboard of the managed host and wherein the BMC resides on a specially-purposed chip that couples with the motherboard, the specially-purposed chip being serviceable as a field-replaceable unit (FRU) independent of the motherboard.

6. The method of claim 1, wherein the predefined trigger event is a detected new coupling between the BMC and the managed host.

7. The method of claim 1, wherein the predefined trigger event is a detected intrusion to a chassis storing the processing device.

8. A processing device, including:
a baseboard management controller (BMC) that executes system firmware on behalf of a managed host coupled to the BMC;
a trigger event detector stored in memory and configured to detect a predefined trigger event;
a self-heal agent stored in memory that is powered on during a safe boot mode sequence initiated in response to detection of the predefined trigger event, the self-heal agent including platform-independent control electronics configured to:
detect architectural characteristics of the managed host;
autonomously and without powering on a central processing system of the managed host, establish a connection to a cloud-based firmware catalog and provide the cloud-based firmware catalog with the architectural characteristics of the managed host; and
download a new version of the system firmware from the cloud-based firmware catalog that is executable by the BMC and that is compatible with the architectural characteristics of the managed host,
the processing device being configured to automatically install the new version of the system firmware without powering on the central processing system of the managed host.

9. The processing device of claim 8, wherein the self-heal agent is further configured to record an instance of the safe boot mode sequence, and wherein the managed host downloads and installs a new operating system in response to reading the instance of the safe boot mode sequence during a subsequent boot sequence.

10. The processing device of claim 9, wherein the processing device verifies, in response to installation of the new operating system, that each of multiple firmware components installed on the managed host matches a last known good (LKG) version associated with the new operating system.

11. The processing device of claim 9, wherein the connection between the self-heal agent and the cloud-based firmware catalog is through a first network interface controller (NIC) that is different from a second NIC utilized by the central processing system of the managed host.

12. The processing device of claim 9, wherein the self-heal agent includes a microprocessor that resides on a motherboard of the managed host and wherein the BMC resides on a specially-purposed chip that couples with the motherboard, the specially-purposed chip being serviceable as a field-replaceable unit (FRU) independent of the motherboard.

13. The processing device of claim 9, wherein the predefined trigger event is a detected new coupling between the BMC and the managed host.

14. The processing device of claim 9, wherein the predefined trigger event is a detected intrusion to a chassis storing the processing device.

15. One or more tangible computer-readable storage media storing computer-executable instructions for executing a computer process that securely resets a processing device to a known and trusted state, the computer process comprising:
detecting a predefined trigger event in the processing device, the processing device including a baseboard management controller (BMC) that executes system firmware on behalf of a managed host coupled to the BMC;
in response to detecting the predefined trigger event on the processing device, initiating a safe boot mode sequence that provides power to a self-heal agent while maintaining a central processing system of the managed host in an off state, the self-heal agent including platform-independent control electronics configured to:
    detect architectural characteristics of the managed host;
    autonomously establish a connection to a cloud-based firmware catalog service and transmit the architectural characteristics of the managed host to the cloud-based firmware catalog service; and
    download replacement system firmware from the cloud-based firmware catalog service that is executable by the BMC and that is compatible with the architectural characteristics of the managed host; and
automatically installing the replacement system firmware without powering on the central processing system of the managed host.

16. The one or more tangible computer-readable storage media of claim 15, wherein the self-heal agent is further configured to record an instance of the safe boot mode sequence and wherein the computer process further comprises:
    initiating a reboot of the processing device following installation of the replacement system firmware; and
    downloading and installing a new operating system for the managed host in response to reading the instance of the safe boot mode sequence during the reboot.

17. The one or more tangible computer-readable storage media of claim 16, wherein the computer process further comprises:
    verifying, in response to installation of the new operating system, that each of multiple firmware components installed on the managed host matches a last known good (LKG) version associated with the new operating system.

18. The one or more tangible computer-readable storage media of claim 15, wherein the connection to the cloud-based firmware catalog is through a first network interface controller (NIC) that is different from a second NIC utilized by the central processing system of the managed host.

19. The one or more tangible computer-readable storage media of claim 15, wherein the self-heal agent includes a microprocessor that resides on a motherboard of the managed host and wherein the BMC resides on a specially-purposed chip that couples with the motherboard, the specially-purposed chip being serviceable as a field-replaceable unit (FRU) independent of the motherboard.

20. The one or more tangible computer-readable storage media of claim 15, wherein the predefined trigger event is at least one of a detected new coupling between the BMC and the managed host or a detected intrusion into a chassis storing the processing device.

\* \* \* \* \*